United States Patent [19]

Meraj et al.

[11] 4,386,557
[45] Jun. 7, 1983

[54] HEATING APPARATUS FOR PREPARATION OF PRECOOKED FROZEN WAFFLES

[76] Inventors: Paul P. Meraj, 18065 Greenmeadow, Encino, Calif. 91316; David Meraj, 888 Toulon Dr., Pacific Palisades, Calif. 90272

[21] Appl. No.: 826,448

[22] Filed: Aug. 22, 1977

[51] Int. Cl.³ .............................................. A47J 37/06
[52] U.S. Cl. ...................................... 99/372; 219/460
[58] Field of Search ........................ 99/372, 331–332, 99/349, 375–376, 379–380, 386, 391, 400, 402, 443; 219/460–463, 525, 530, 536

[56] References Cited

U.S. PATENT DOCUMENTS

| Re. 17,114 | 10/1928 | Chandler | 99/379 |
|---|---|---|---|
| 1,229,862 | 6/1917 | Bargamin | 99/332 X |
| 1,374,522 | 4/1921 | Peterson | 99/376 X |
| 2,009,790 | 7/1935 | Shroyer | 99/332 X |
| 2,066,507 | 1/1937 | Yost | 99/379 X |
| 2,427,451 | 9/1947 | Ellestad | 99/372 |
| 2,765,728 | 10/1956 | Pearce | 99/372 |
| 3,245,337 | 4/1966 | White et al. | 99/375 X |
| 3,593,648 | 7/1971 | Walters | 99/332 |
| 3,696,734 | 10/1972 | Beasley et al. | 99/375 X |
| 3,848,110 | 11/1974 | Giguere et al. | 219/525 |

*Primary Examiner*—Billy J. Wilhite
*Assistant Examiner*—Arthur O. Henderson
*Attorney, Agent, or Firm*—Nilsson, Robbins, Dalgarn, Berliner, Carson & Wurst

[57] ABSTRACT

A precooked, frozen waffle heating apparatus including first and second metallic castings or molds having opposed confronting faces conforming to the reciprocal of a waffle pattern and contained within upper and lower portions of a housing defining a hollow chamber surrounding the upper portion of the molds. A timer is disposed externally of the housing but affixed thereto for indicating the residence time of a waffle within the molds.

1 Claim, 3 Drawing Figures

HEATING APPARATUS FOR PREPARATION OF PRECOOKED FROZEN WAFFLES

BACKGROUND OF THE INVENTION

Waffles have been in existence for a substantial period of time and are considered by many people as an excellent food item. The high ridge type waffle, sometimes referred to as a Belgian waffle, when freshly cooked, is very light and is very crisp on the exterior thereof. As a result of the particular consistency and the crispness of the Belgian waffle, it is considered by many as a delicacy and is often utilized as a dessert waffle and may as well be consumed during regular mealtime. Belgian waffles are also more expensive because it is difficult to make the batter and to cook the waffles in a manner to obtain the desired quality thereof.

Although there have been many attempts to do so, Belgian waffles are not utilized in restaurants except in some rare specialty houses, because of the difficulty in making the batter and maintaining its freshness as well as in properly cooking the same.

In most restaurants, a waffle is considered an item to be prepared by the short order cook. In most cases the batter is prepared by the short order cook, poured, and baked in a waffle baking apparatus and then served immediately to customers. This is an involved and time-consuming effort for the short order cook who has to simultaneously handle many breakfast items. Efforts have been expanded in the past to provide precooked frozen waffles for quick and convenient reheating. Such waffles have been successfully marketed for consumption in homes as a convenience item (mostly consumed by children). However, they have not achieved any degree of success for use in restaurants. This is due to lack of sufficient quality demanded by restaurants in the end product after it has been reheated from a frozen state. For such waffles to be like freshly cooked they must be brought from a frozen to a heated state without drying out the surface and without loss of moisture. Such must be done rapidly to meet the time requirements of short order cooking while at the same time not overcooking or burning the exterior of the waffle leaving the center thereof in a frozen state.

In heating precooked frozen waffles, two methods have been devised. First is to heat the ambient air surrounding the waffle and thus raise the temperature of the waffle such as in toaster or oven and the other is to heat the waffle with microwaves. However, both methods are deemed to have important deficiencies which are particularly serious with regards to the high ridge waffles.

When the ambient air is heated, the temperature of the air surrounding the waffle is considerably higher than the temperature of the surface of the waffle and this causes evaporation of the moisture from the surface of the waffle leaving it dry. Some attempts have been made to wrap the waffles in a foil package or the like to retain the moisture. Laboratory experiments show that the moisture is still evaporated from the surface of the waffle and is retained within the foil package and causes the waffle to become soggy and not very tasty. Secondly, the ambient temperature is usually raised by radiation from a heated element or gas fire positioned in an oven or toaster. Such radiation bears directly on the waffle surface and overcooks or burns the delicate surface while the denser and more massive center remains cold. This problem is particularly acute with high ridge type waffles.

Some of the precooked frozen waffles are designed to be heated in the common electrically energized toaster. Such waffles have their size determined by the toaster and must therefore be thin so as to fit within the opening in the common household toaster. Under such conditions the high ridge type (Belgian) waffle cannot be used. In addition thereto, the toaster uses direct radiant exposed heat which warms the frozen waffle from the outside in. This can cause burning on the outside of the waffle while it remains frozen inside particularly if there is any significant thickness to the waffle. Also, through the utilization of an open system, moisture contained within the waffle is lost, thus drying out the waffle.

Infrared heating chambers have also been utilized for heating precooked frozen waffles. Such devices require special insulation and thus take up a large amount of space. The infrared heater also tends to dry out the waffle and it is extremely critical as to the amount of time during which the waffle is exposed to the infrared heater and thus burning often occurs.

A regular baking oven has been found to be relatively successful if it is preheated to approximately 400°–425° F. and the frozen waffle is left in the oven for approximately seven to 10 minutes. However, this does not permit some of the moisture contained within the frozen waffle to be lost to the ambient within the oven. Thus the waffle does not taste like a freshly baked waffle. In commercial establishments such as restaurants, a regular oven usually is not available at the position therein occupied by the short order cook. In addition, the oven is used for numerous other things and thus cannot always be kept available at the proper temperature needed to heat the frozen waffles. But also a time span of 7–10 minutes required for oven reconstitution is not acceptable to the short order cook since it is substantially in excess of its cooking time requirements for breakfast items.

When a microwave oven is utilized to heat the frozen waffles, the waffle is heated from the inside out by agitation of the water molecules and thus the moisture contained in the more massive center section of the waffle is driven to the surface thereof. Such results in a relatively soggy waffle which, for the most part, is unpalatable.

There is no known prior art directed specifically to applicants' invention. There is prior art directed to waffle irons which are normally used to bake waffles as well as other food heating and preparing apparatus. The best such art known is U.S. Pat. Nos. 1,680,402, 1,769,045, 3,108,531, 3,245,337 and 3,999,473.

SUMMARY OF THE INVENTION

A heater unit for heating a precooked and frozen waffle including solid metal hinged first and second mold members having confronting faces for receiving a predetermined waffle pattern with heater means retained on each of the mold members. Base and cover means are provided for the mold members. to thus define a housing therefor while a timer is affixed to the heater unit for indicating the time during which a waffle is retained between the molds for heating the same.

DETAILED DESCRIPTION OF THE PREFERRED EMBODIMENTS

Figure 1:
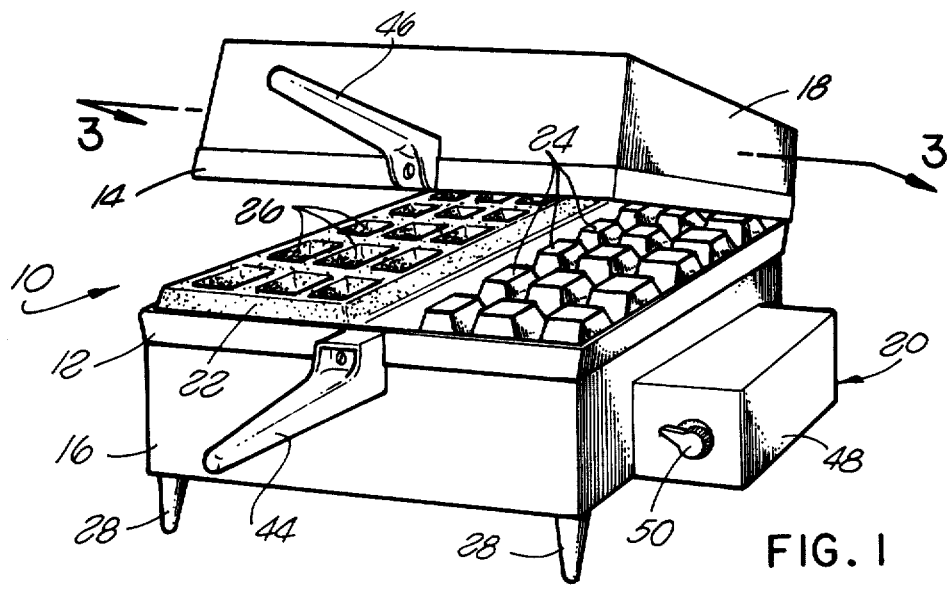
FIG. 1 is a perspective view of a waffle heating unit in accordance with the present invention.

As is illustrated in FIG. 1 the heater unit 10 includes a first and second waffle mold member 12 and 14 contained within first and second housing halves 16 and 18 with a timer 20 affixed to the first housing half 16. When one desires to prepare a waffle as illustrated at 22, which has been precooked and frozen, the heater unit 10 is preferably utilized for that purpose.

The waffle 22 is removed from its package where it has been maintained in a frozen condition prior to the time when it is desired to prepare it for consumption. The waffle is then placed within the heating unit in such a manner that the lugs 24 fit within the depressions 26 formed in the face of the waffle 22 when it was originally baked. It can thus be seen that the faces of the molds 12 and 14 which are confronting provide substantially a reciprocal of the pattern appearing in the faces of the waffle.

It has been discovered that upon freezing, a precooked waffle shrinks somewhat and upon reheating it returns to its original freshly cooked size. As a result, the depressions 26 in the face of a frozen waffle are somewhat smaller than when the waffle is freshly cooked. Furthermore, the periphery of the waffle shrinks more proportionally than does the center thereof. To accommodate these size changes and to preclude damage to the frozen waffle when attempting to fit the same into the heating apparatus, the lugs 24 must be properly sized to receive the depressions 26 and to provide space for the ridges defining the depressions, while the overall size of the mold must be capable of accommodating the heated thawed waffle having returned to its original size. Therefore the lugs within a mold are constructed to receive the smaller depressions in the waffle wth the peripheral lugs defining a smaller area than the central lugs. The overall dimension of the mold interior is that of the freshly cooked waffle.

When the frozen waffle is properly seated such that the lugs 24 are inserted into the depressions 26 within the faces of the waffle and thus are in contact therewith, the first and second molds 12 and 14 are closed to completely encompass and effectively seal the waffle within the molds. Thereafter the timer 20 is set for the predetermined desired time required to heat the waffle for its consumption. It has been found that if the heater is maintained in a preheated condition at the proper temperature of approximately 300°–325° F. that a period of approximately two minutes is normally sufficient to thaw and heat the waffle and place it in a condition where it is consumable and tastes substantially like a freshly baked waffle. If the consumer desires a waffle which is extra crisp, then it has been found that a period of three minutes is normally adequate to provide the desired texture of an extra crisp waffle.

It will be recognized by those skilled in the art that the waffle 22 as illustrated in FIG. 1 is of the high ridge type commonly known as a Belgian waffle. Belgian waffles are considered delicacies and are often utilized for desserts as well as for the typical breakfast menu. Belgian waffles are rather difficult to make in that the batter is more difficult to make and maintain than regular waffles and also the waffles, once cooked, are difficult to maintain in their fresh cooked condition insofar as tastes are concerned. It has been found that through utilization of the heater apparatus of the present invention Belgian waffles may be baked, immediately frozen, maintained in the frozen condition and then heated and thereby maintain substantially the quality, texture and crispness of the freshly baked Belgian waffle.

Figure 2:
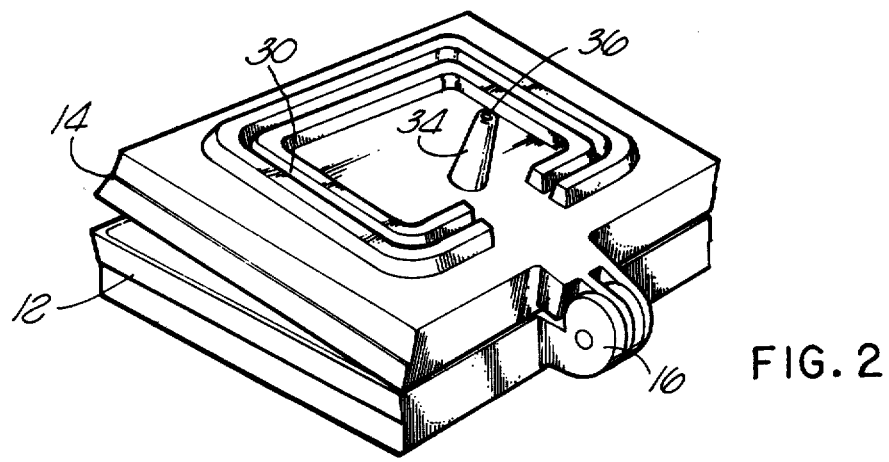
FIG. 2 is a perspective view of the waffle molds removed from the housing.

By reference to FIG. 2 there is illustrated the first and second molds 12 and 14 removed from the housing 16–18. As is noted the molds are hinged together by the hinge means 16 which is formed by a traditional clevis arrangement. As is shown the U-shaped portions formed on the first mold 12 with a single member formed on the mold 14 which is inserted between the U-shaped portion with a hinge pin secures the mold halves. Each of the molds 12 and 14 define a groove 30 extending about the upper portion thereof as is more clearly illustrated in FIG. 3. Disposed within the groove 30 is a heating element 32 which is in intimate contact with the mold 14. The mold 14 also includes a stand-off 34 which is formed integrally therewith and which contains a bore 36 which is threaded to receive a fastening means 38 which retains the upper cover of the housing 18 in place upon the second mold 14.

Figure 3:
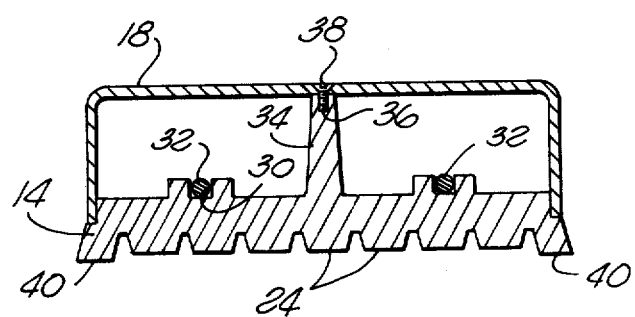
FIG. 3 is a cross sectional view taken about the lines 3—3 of FIG. 1 and illustrating in further detail the relationship between the housing and a mold member.

The faces of the molds 12 and 14 contain a flat peripheral edge portion as shown at 40 in FIG. 3. The two edge portions 40 extend slightly outwardly from the plane formed by the surface of the lugs 24 and is more clearly illustrated in FIG. 3. The flat surfaces 40 on the periphery of the molds 12 and 14 engage each other when the first and second molds are closed thereby effectively sealing the interior of the molds to substantially preclude loss of moisture contained within the frozen waffle during the time is is being heated.

It will also be noted that by the particular design of the base 16 and cover 18 of the housing there is defined a hollow chamber between the interior of the housing and the back portion of the mold halves as more clearly illustrated in FIG. 3 at 42. A similar hollow chamber exists beneath the mold 12 and the base 16 of the housing. As will also be noted in FIG. 1 the base 16 rests upon a plurality of legs 28 which permits some air circulation beneath the heater unit. A pair of handles 44 and 46 are affixed to the molds 12 and 14, respectively, to enable the operator to open and close the two molds about the hinge means 16.

The timer 20 includes a timer housing 48 which is affixed to the base 16 and exposed exteriorly thereof. In this manner the components of the timer are not subjected to the heat generated by the waffle mold 12 during operation thereof. The timer mechanism includes a handle 50 which may be used to set the desired time of residence for a precooked frozen waffle within the heating unit. Thus the operator would, after placing the frozen waffle 22 between the molds 12 and 14 securely seating the lugs 24 within the depressions 26 close the same, set the handle 50 on the timer for the desired amount of residence time of the waffle within the heater, for example, two or three minutes as above indicated. When the preset time has elapsed the timer 20 provides an audible or visual indication thereof. Preferably, a buzzer would sound to attract the operator's attention. Obviously any type of timer may be utilized as desired, either electrical or mechanical.

As will be noted particularly from FIG. 3 the waffle molds are constructed of solid cast metal and are preferably constructed of aluminum although cast iron would also be appropriate. Through the utilization of the cast metal member for the waffle mold, heat is evenly distributed from the heater element 32 throughout the entire confronting surfaces of the waffle molds in a very even manner thus eliminating hot spots which would tend to burn the waffles once they are placed therein. In addition, the base and cover 16 and 18, forming the housing, are each formed of hollow shell-like members having one open side which is closed by the appropriate waffle molds 12 and 14 to thus define the hollow chambers within which the heating elements are disposed. The hollow chambers by defining a dead air space also maintain the surface of the molds at a relatively constant temperature.

From the foregoing description those skilled in the art will recognize that a waffle heating apparatus has been provided which intimately engages the entire surface of a precooked frozen waffle through provision of the metallic confronting surfaces on the opposed molds with a pattern substantially the reciprocal of the waffle pattern. Through such intimate engagement and the effective sealing of the periphery of the mold a substantially closed system is provided to thereby retain the natural moisture within the waffle. Thereby a very short time span is required to thaw and heat the waffle throughout and ready it for consumption rendering the heating apparatus extremely useful for short order cooking.

We claim:

1. A heater unit for heating precooked and frozen waffles comprising:
   (A) a base including a first hollow shell-like member having one open side and disposed upon a plurality of legs;
   (B) a first solid cast-metal waffle mold affixed to said base and closing said one open side thereof to define a first hollow chamber;
   (C) a cover including a second hollow shell-like member having one open side;
   (D) a second solid cast metal waffle mold affixed to said cover and closing said one open side thereof to define a second hollow chamber, said first and second molds each including a substantially flat continuous peripheral surface, said flat surfaces when in contact with each other effectively sealing the interior of said molds to substantially retain the moisture present in a frozen waffle being heated in said unit;
   (E) hinge means interconnecting said first and second waffle molds at one edge thereof to allow the opening and closing thereof to cause faces thereof to be confronting when closed, said confronting faces including lugs and recesses defining a pattern therein substantially the reciprocal of a precooked and frozen waffle to be placed therein for heating, said lugs having a dimension which is slightly less than the dimension of a depression in the surface of a freshly cooked waffle before it is frozen for receiving a frozen slightly shrunken precooked waffle within said lugs without damage thereto and to accommodate return of the waffle to its original freshly cooked size, said lugs including peripheral lugs and central lugs, said peripheral lugs defining a smaller surface area than said central lugs to accommodate a differential in contraction and expansion between the periphery and the center of the precooked waffle on freezing and reheating thereof; and
   (F) a heater element secured to and in intimate contact with each of said first and second waffle molds and disposed within said chamber.

* * * * *